United States Patent
Engemann

(10) Patent No.: US 8,747,035 B2
(45) Date of Patent: Jun. 10, 2014

(54) METHOD FOR PRODUCING BEVEL GEARS HAVING HYPOCYCLOIDAL TEETH IN THE CONTINUOUS FORMING METHOD USING CORRESPONDING TOOLS

(75) Inventor: Karl-Heinz Engemann, Gersthofen (DE)

(73) Assignee: Klingelnberg AG, Zurich (CH)

( * ) Notice: Subject to any disclaimer, the term of this patent is extended or adjusted under 35 U.S.C. 154(b) by 90 days.

(21) Appl. No.: 13/440,903

(22) Filed: Apr. 5, 2012

(65) Prior Publication Data

US 2012/0263550 A1 Oct. 18, 2012

Related U.S. Application Data

(63) Continuation of application No. PCT/EP2010/064067, filed on Sep. 23, 2010.

(30) Foreign Application Priority Data

Oct. 5, 2009 (EP) .................................. 09172255

(51) Int. Cl.
*B23F 9/08* (2006.01)
(52) U.S. Cl.
USPC ................ 409/26; 409/28; 409/38; 409/39; 409/51

(58) Field of Classification Search
USPC .......... 409/25, 26, 28, 29, 38, 39, 40, 50, 51, 409/55
See application file for complete search history.

(56) References Cited

U.S. PATENT DOCUMENTS

| | | | |
|---|---|---|---|
| 1,982,036 A | | 11/1934 | Wildhaber |
| 2,105,104 A | | 1/1938 | Wildhaber et al. |
| 2,310,484 A | | 2/1943 | Wildhaber |
| 2,783,686 A | * | 3/1957 | Ciallie et al. ................... 409/26 |
| 3,020,808 A | | 2/1962 | Apitz |
| 4,353,671 A | * | 10/1982 | Kotthaus ........................ 409/26 |
| 4,565,474 A | * | 1/1986 | Charles .......................... 409/51 |
| 4,799,337 A | * | 1/1989 | Kotthaus ........................ 451/1 |
| 5,716,174 A | * | 2/1998 | Stadtfeld et al. ............... 409/26 |
| 6,712,566 B2 | * | 3/2004 | Stadtfeld et al. ............... 409/26 |

FOREIGN PATENT DOCUMENTS

EP 1 348 509 A2 10/2003

OTHER PUBLICATIONS

Kedrinskij, V. N., et al., "Stanki dja obrabotki konitscheskich zubtschatych kolos," Izdatelstvo "Maschinostroenie", 1967, pp. 506-508, Izdanie 2-e, Moskva.
Klingelnberg, Jan, "Kegelräder; Grundlagen, Anwendungen [Bevel Gears; Foundations, Applications]", 2008, pp. 16-17 and 39-41, Springer Verlag.
International Search Report from International Application No. PCT/EP2010/064067, mailed Nov. 9, 2010.
Written Opinion of the International Searching Authority from PCT/EP2010/064067, dated Apr. 5, 2012.

* cited by examiner

*Primary Examiner* — Daniel Howell
*Assistant Examiner* — Michael Vitale
(74) *Attorney, Agent, or Firm* — McCarter & English LLP

(57) ABSTRACT

The invention relates to the production of plunge-cut crown wheels having straight or linear hypocycloid as the flank longitudinal line of the teeth. The production is performed by means of a forming method in which the axial movements are coupled. Corresponding pinions can be produced using a modified hobbing method. A corresponding tapered generating wheel is used. The milling tool carries multiple cutters. The teeth of the conical virtual generating wheel are reproduced in the engagement area by the blades or blade flanks of the cutters of the milling tool.

17 Claims, 11 Drawing Sheets

METHOD FOR PRODUCING BEVEL GEARS HAVING HYPOCYCLOIDAL TEETH IN THE CONTINUOUS FORMING METHOD USING CORRESPONDING TOOLS

CROSS-REFERENCE TO RELATED APPLICATIONS

This application is a continuation of similarly-titled International Patent Application No. PCT/EP2010/064067, filed Sep. 23, 2010, and claims priority to European Patent Application No. EP 09 172 255.3, filed Oct. 5, 2009, the content of which are hereby incorporated by reference in their entireties as part of the present disclosure.

FIELD OF THE INVENTION

The present invention relates to methods for producing straight-toothed bevel gears having hypocycloidal teeth in the continuous forming method, in particular using milling cutter heads.

BACKGROUND OF THE INVENTION

There are various types of bevel gears, these types being differentiated, inter alia, on the basis of the profile of the flank longitudinal lines. The following bevel gears are differentiated according to the profile of the flank longitudinal lines: straight-toothed bevel gears, helical-toothed bevel gears and spiral-toothed bevel gears.

Bevel gear pair teeth can be uniquely established by the associated virtual plane gear teeth (if the pitch cone angles are known). The corresponding plane gear can also be imagined as a wafer-thin profile disc. The plane gear results from the bevel gear teeth in that the pitch cone angle is set to $\delta_p = 90°$.

In the case of spiral-toothed bevel gears, a further subdivision is possible with respect to the shape of the flank longitudinal line: circular arcs, epicycloids, in particular extended epicycloids, involutes, and hypocycloids, in particular extended hypocycloids.

Circular-arc-toothed bevel gears have a circular arc as a flank longitudinal line. Circular-arc-toothed bevel gears are manufactured in a single indexing method (also referred to as intermittent indexing process, single indexing process, or face milling). The single indexing method is schematically shown in FIG. 1A. The cutter 21 of a cutter head 20 completes a circular movement while the bevel gear 11 to be produced rests in a fixed position. To manufacture further tooth gaps, the cutter head 20 is retracted and the workpiece 11 is rotated by an indexing angle. The step-by-step further rotation (counterclockwise here) is indicated in FIG. 1A by the arrows A, B, and C. Therefore, one tooth gap 22 is always manufactured at a time.

Epicycloidal, in particular expanded-epicycloidal (also referred to as extended-epicycloidal) toothed gearwheels are manufactured by a continuous indexing method (also referred to as continuous hobbing, continuous indexing process, or face hobbing). In the production of the epicycloids in the continuous indexing method, the ratio of plane gear tooth count $z_p$ of the bevel gear to number of threads $G_x$ of the bar cutter head (number of the cutter groups) corresponds to the ratio of the radius RG of the base circle GK and the radius RR of the rolling circle RK. One refers to an extended epicycloid when the cutter head nominal radius $r_c$, on which the blades of the cutter 23 are seated, is greater than the radius RR of the rolling circle RK (see FIG. 1B). In this continuous indexing method, both the cutter head and also the workpiece 11 rotate in a movement sequence which is chronologically adapted to one another. The indexing is thus performed continuously and gaps 12 and the corresponding teeth 13 are produced quasi-simultaneously. A corresponding example is shown in FIG. 1B. The cutter head rotates counterclockwise here, while the workpiece 11 rotates clockwise (this rotational movement is also referred to as plane gear rotation). An epicycloid, specifically, an extended epicycloid is produced here. The movements thus occur here in opposite directions. If both the cutter head and the workpiece rotate in the same direction, a hypocycloid is produced (as shown in FIG. 1C). FIG. 1B shows that the cutters 23 of a corresponding cutter head are typically situated in pairs (also referred to as in groups in the case of two, three, or more cutters per cutter group). FIG. 1B shows that the rolling circle RK of the cutter head rolls along the base circle GK of the workpiece 11. M refers to the center point of the cutter head here. This center point M is coincident with the center point of the rolling circle RK. The coupling of the two rotational movements is performed so that only one cutter pair, or one cutter group, moves through a tooth gap 12 in each case.

A bevel gear having a "rectilinear" hypocycloid as a flank longitudinal line can be produced according to the principle shown in FIG. 2. The mathematical principle shown is known from various textbooks, but also from European Patent Application No. EP 1348509 A2. Fundamentally, this approach is also known from "Stanki dja obrabotki konitscheskich zubtschatych kolos", Izdanie 2-e, V. N. Kedrinskij, K. M. Pismanik, Izdatelstvo "Maschinostroenie" Moskva 1967, pages 506-508.

The method which is described in European Patent Application No. EP 1348509 A2 is used more in the case of smaller transmission ratios.

In order to obtain a hypocycloid, the rolling circle RK having the radius RR rolls in the interior of the fixed base circle GK having radius RG. The rolling circle RK rotates around its axis (center point M), as indicated by the arrow P1. As indicated by the arrow P2, the rolling circle RK rolls counterclockwise in the interior of the base circle GK (the rotational direction could also be reversed). The pointer Z1 is oriented radially outward fixed in place in the rolling circle RK and is associated with a generating point U on the circumference of the rolling circle RK. The point U is fixed in place in the coordinate system of the rolling circle RK. That is, the point U is fixedly connected to the rolling circle RK. Through the hobbing movement of the point U, i.e., through its own rotation around the point M coupled to the satellite movement around the center point of the base circle GK, the point U produces a hypocycloid HY in the x-y coordinate system of the base circle GK, or a straight line in the special case shown. The point U thus defines or describes a linear hypocycloid (HY), when the rolling circle RK rolls in the base circle GK. The cutter head radius $r_c$ is equal to the radius of the rolling circle RR here. The two circles RK and GK are shown in a Cartesian x-y coordinate system here.

The parameter representation in this x-y coordinate system reads as follows:

$$x = (RG - RR)\cos\lambda - RR\cos\frac{RG - RR}{RR}\lambda \qquad (1)$$

$$y = (RG - RR)\sin\lambda - RR\sin\frac{RG - RR}{RR}\lambda \qquad (2)$$

In these equations (1) and (2), $\lambda$ represents the rotational angle of the center point M of the rolling circle RK in relation to the center point MG of the base circle GK. A snapshot is shown in FIG. 2 where the following applies: λ=0, x=RG, y=0. The coordinates of the point U read [RG, 0].

FIGS. 3A to 3H show on the basis of a sequence that there is a special case in which the hypocycloid HY becomes a straight line. In these figures, the references and reference signs were intentionally omitted, so as not to impair the clarity of the illustration. However, the references and reference signs of FIG. 2 can be taken over one-to-one. A straight line results when the condition RR=RG/2, or RG/RR=2, is met. It may be seen on the basis of FIGS. 3A to 3H that the generating point U is displaced starting from the illustration in FIG. 3A (λ=0°) along the x axis from the coordinate position [RG, 0] to the left to the coordinate position [−RG, 0]. In FIG. 3E (λ=180°), this coordinate position [−RG, 0] is reached. The rolling circle RK now rolls through the two lower quadrants of the x-y coordinate system and the point U moves from the coordinate position [−RG, 0] back to the coordinate position [RG, 0]. The straight line HY is a distance which extends in the figures along the x axis from [RG, 0] to [−RG, 0].

Special shapes of the hypocycloids can also be explained on the basis of the figures shown. The special shapes are produced as follows. When generating point U is located inside or outside the rolling circle RK, it corresponds to either an abbreviated hypocycloid or extended hypocycloid, respectively. The distance between the center M (see FIG. 2) of the rolling circle RK and the position of the generating point U is described by the parameter c. Therefore, c<RR produces an abbreviated hypocycloid and c>RR produces an extended hypocycloid. An extended hypocycloid having c=1.5 RR is shown in FIG. 4A. The pointer Z2 thus has the length c=1.5 RR (the variable c corresponds to the cutter head nominal radius $r_c$ in FIG. 1B). The cutter head nominal radius $r_c$ is thus $r_c$=1.5 RR here. An abbreviated hypocycloid having c=0.5 RR is shown in FIG. 4B. The pointer Z3 thus has the length c=0.5 RR. The cutter head nominal radius $r_c$ is thus $r_c$=0.5 RR here. In each case an ellipse is produced as the hypocycloid HY, whose parameter representation as a function of the angle λ in the x-y coordinate system reads as follows:

$$x = \left(\frac{RG}{2} + c\right)\cos\left(\frac{\lambda}{2}\right) \quad (3)$$

$$y = \left(\frac{RG}{2} - c\right)\sin\left(\frac{\lambda}{2}\right) \quad (4)$$

If c=RR and RR=RG/2, then the linear hypocycloid obtained is a special case, as already described.

With respect to the face milling cutter heads used to produce bevel gears, one differentiates between so-called bar cutter heads and profile cutter heads. A bar cutter head is equipped with a large number of bar cutters (e.g., forty), each bar cutter having a shaft and a head area. The head area can be given a desired shape and position by grinding the bar cutter. Bar cutter heads are more productive than profile cutter heads, which contain fewer cutters, and the bar cutters can be reprofiled. Conversely, a profile cutter head is equipped with relief-ground cutters. These profile cutters (also referred to as form cutters) maintain their profile shape on the machining surface upon re-grinding. It is an advantage of bevel gear milling using profile cutters that no special grinding machine is required for the re-grinding of these form cutters. The known Zyklo-Palloid® method, for example, uses such profile cutters to produce spiral bevel gears.

It is known that a crown wheel can be produced not only by hobbing, but rather also by plunge cutting (also referred to as plunging). One refers in this case to a forming method or also to a FORMATE® gear cutting (The Gleason Works, Rochester, N.Y., USA). This procedure saves time during the manufacturing of the crown wheel. Since no hobbing movement occurs, the tool profile is reproduced in the crown wheel gaps. The crown wheel thus manufactured has the profile of the tool, i.e., the profile curvature of the tooth flanks results directly from the tool profile shape of the first tool. The corresponding conjugated pinion of a bevel gear pair must then be produced in a modified hobbing method, however, so that the hobbed pinion and plunge-cut crown wheel can run correctly with one another. Details in this regard can be inferred, for example, from the book "Kegelräder; Grundlagen, Anwendungen [Bevel Gears; Fundamentals, Applications]", by J. Klingelnberg, Springer Verlag, 2008, pages 16-17. A method for the production of a plunge-cut crown wheel and a matching hobbed pinion is known from U.S. Pat. No. 1,982,036, both bevel gears having conically tapered ("tapered") teeth. Details on the mentioned method can be inferred from U.S. Pat. Nos. 2,105,104 and 2,310,484. These U.S. patents relate to the production of helical-toothed or spiral-toothed bevel gears, respectively.

The invention relates to the milling of bevel gears having hypocycloidal teeth and in particular the milling of straight-toothed bevel gears.

The methods currently used for milling straight-toothed bevel gears are hobbing, such as, for example, Coniflex®, Konvoid, and Sferoid™, and broaching (also known as the Revacycle® method). Two disc-shaped cutter heads of equal size are used in the case of hobbing, in which the cutters on the outer circumference point radially outward. The axes of the two cutter heads are inclined to one another, so that at the narrowest point the cutters of one cutter head may engage between the cutters of the other. One cutter head is thus used for the left flanks and another cutter head is used for the right flanks. This hobbing of straight-toothed bevel gears is a single indexing method, in which the crown gear and bevel gear pinion are hobbed. The broaching method is also a single indexing method but the tooth flanks of crown gear and bevel gear pinion are not produced by envelope cuts as in hobbing. Rather, the cutter profiles in broaching exactly correspond to the shape of the final gap profile of the bevel gear. The broaching method is more productive than hobbing in the single indexing method, but has the disadvantage that a special disc-shaped broaching cutter head having a plurality of various die cutters on the circumference is required for almost every bevel gear (transmission ratio).

The time expenditure for the hobbing production of bevel gear pairs is sometimes relatively great. This finding also applies for bevel gears having hypocycloidal teeth.

Therefore, the invention is based on the object of providing a solution, which allows straight-toothed bevel gears to be manufactured rapidly and productively. In particular, it also relates to the manufacturing of bevel gear pairs made of straight-toothed pinion and straight-toothed crown wheel.

SUMMARY OF THE INVENTION

The invention is therefore based, inter alia, on the finding that during the conventional hobbing of a crown wheel, there can be a machining phase, during which the milling tool hardly withdraws material from the crown wheel blank. During this machining phase, the milling tool does not operate productively. It has been shown that the machining time of a crown wheel can be shortened when restricted solely to plunge cutting. However, a slightly different tooth profile of the teeth of the crown wheel results. The associated pinion must therefore be produced using a correspondingly adapted hobbing method, so that the plunge-cut crown wheel and the hobbed pinion can run correctly with one another, or form a functional bevel gear pair. The adapted hobbing method is referred to here as a modified hobbing method.

In a method according to the invention, only the crown wheel is plunge cut, while the pinion is hobbed via the modified hobbing method. This method has proven to be particularly effective and rapid.

One advantage of the invention is that straight-toothed gear wheels can be produced rapidly and efficiently on multi-axis bevel gear cutting machines using the present method. Therefore, there is no need to use special machines for the production of the straight teeth.

Another advantage of the invention is that the invention may be used to produce conjugated teeth at constant tooth height.

Spiral bevel gear pairs and also hobbed straight-toothed bevel gear pairs can be produced on the same gear cutting machines. Therefore, the method unifies high flexibility with high productivity.

DETAILED DESCRIPTION OF EMBODIMENTS OF THE INVENTION

Terms are used in connection with the present description which are also used in relevant publications and patents. However, it is to be noted that the use of these terms is only to serve for better understanding. The ideas according to the invention and the scope of protection of the patent claims are not to be restricted in their interpretation by the specific selection of the terms. The invention may be readily transferred to other term systems and/or technical fields. The terms are to be applied accordingly in other technical fields.

Figure 8:
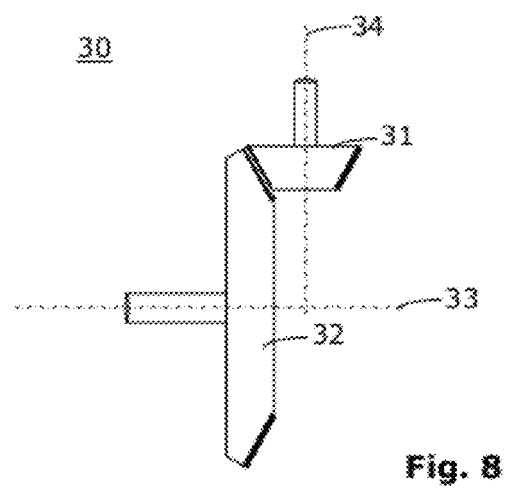
FIG. 8 is a schematic illustration of a bevel gear pair having a straight-toothed pinion and a straight toothed crown wheel.

Bevel gears 31, 32, shown in FIG. 8, have hypocycloidal straight teeth. Hypocycloidal teeth are to be understood in the present application as teeth having a flank longitudinal line which is defined by a hypocycloid. "Hypocycloidal straight teeth" are to be understood herein as teeth having a flank longitudinal line which corresponds to a straight line or which strongly approximates a straight line. An approximately straight line is understood here as an extended or abbreviated hypocycloid whose radius of curvature is greater than 15 times the tooth width, i.e., their curvature is correspondingly small. Such a radius of curvature is hardly recognizable or perceptible at the typical tooth widths and will therefore be considered to be hypocycloidal straight teeth in connection herewith.

In one embodiment, the crown wheel 32 is manufactured by plunge cutting, i.e., by a plunging movement 40 of a first milling tool 50 in relation to a crown wheel blank. Details are shown in a schematic illustration in FIG. 9A. The tapered generating wheel 41 is shown in dashed form in FIG. 9A. The hobbing cradle axis 43 corresponds to the plane gear axis of the generating wheel 41. The cutter head axis of the milling tool 50 is identified by the reference sign 51. The milling tool 50 carries multiple cutters 52 (e.g., bar cutters). The teeth 44 of the conical virtual generating wheel 41 are shown or reproduced in the engagement area by the blades or blade flanks of the cutters 52 of the first cutting miller head 50.

Figure 9A:
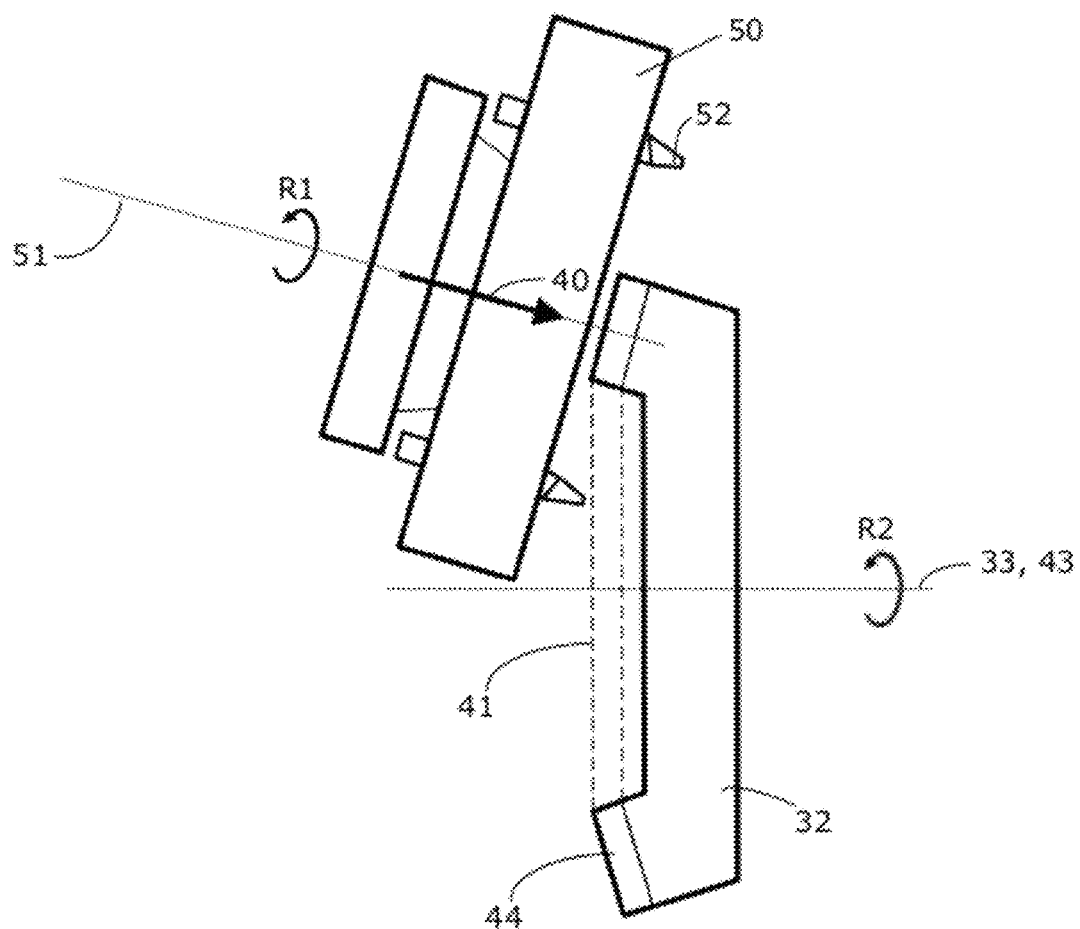
FIG. 9A is a schematic illustration of a forming method according to the invention having plunge-cut crown wheel formed by a tapered generating wheel.

The corresponding plunge cutting process is distinguished in that, for example, the depth position is used as the feed axis for the plunging movement 40, as indicated in FIG. 9A. The hobbing cradle axis is constant because this is a process without hobbing movement. The other variables which produce a reference between the cutting miller head 50 and the crown wheel blank can be constant during the plunge cutting process. If one wishes to modify the crown wheel flank geometry, the other values can also be predefined.

Plunge cutting (also referred to as plunging) is a forming method. Plunge cutting saves time during the manufacturing of the crown wheel 32. Since no hobbing movement occurs, the tool profile of the first milling tool 50 is reproduced in the crown wheel gaps. Accordingly, the resulting crown wheel 32 then has the profile of the tool 50, i.e., the profile curvature of the tooth flanks of the crown wheel 32 results directly from the tool profile form of the tool 50. The profile curvature may have a small curvature viewed in the profile direction.

In one embodiment, the tooth flanks have a radius of curvature that is greater than 20 times the mean normal module, when viewed in the profile direction.

Figure 11A:
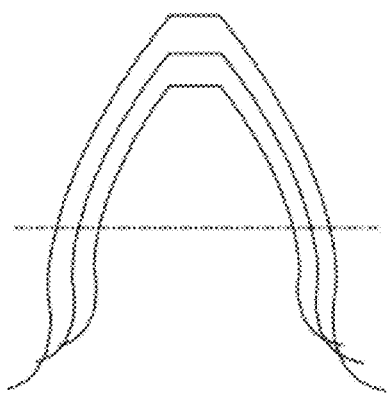
FIG. 11A is a schematic illustration of various profile sections of a modified hobbed pinion according to the invention.
Figure 11B:
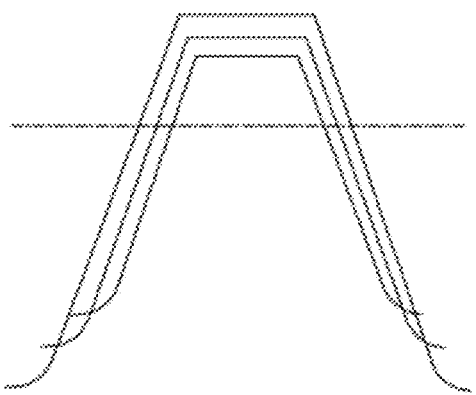
FIG. 11B is a schematic illustration of various profile sections of a plunge-cut crown wheel according to the invention.

In the comparison of conventional crown wheels manufactured by hobbing and crown wheels 32 manufactured by plunge cutting, the following statements may be made. The more strongly the hobbed crown wheel profile is curved, the more strongly the crown wheel 32 that is only plunge cut deviates from this crown wheel profile, and the more the corresponding pinion 31 must be modified so that it can form a well functional bevel gear pair 30 together with the plunge-cut crown wheel 32. A transmission ratio approximately results there from, from which it is advisable to only plunge cut the crown wheel 32. The example in FIGS. 11A and 11B show teeth at 13:47, i.e., the transmission ratio is i=3.61538. The invention may be applied particularly advantageously to bevel gear pairs 30 having a plunge-cut crown wheel 32 and modified hobbed pinion 31 from a transmission ratio of i>2 and particularly from a transmission ratio of i>2.5.

The crown wheel 32 may be manufactured as follows by the milling of tooth gaps. The first milling cutter head 50 (also referred to more generally here as the first tool), which is set into rotation R1 around a tool axis (referred to as cutter head axis 51), is used for milling the tooth gaps of the crown wheel 32. The first tool 50 solely executes a plunge cutting movement 40 during the milling of the tooth gaps on the crown wheel blank 32 to be machined, while the crown wheel blank 32 is rotated continuously around a workpiece axis (also referred to as the bevel gear axis of the crown wheel 33) (rotation R2 in FIG. 9A). As mentioned, the first tool 50 is defined by a conical virtual generating wheel 41, which corresponds to the inverted cone shape of the crown wheel 32 to be manufactured.

The plunge cutting feed defines the speed at which the first milling tool 50 groove plunges into the crown wheel blank 32 in the direction of its cutter head axis 51.

In order that tooth gaps having tooth flanks, which, viewed in the tooth longitudinal direction (i.e., in the direction of the flank longitudinal line) have no curvature or only a slight curvature are milled on the crown wheel blank 32, hypocycloidal straight teeth are produced according to the principle shown in FIGS. 3A to 3H and described in conjunction with these figures. The hypocycloid is the curve in the tooth longitudinal direction (on the virtual generating wheel 41) and therefore a straight line or a curve having slight curvature results in the tooth longitudinal direction. In the crown wheel of a hobbed bevel gear pair, from a specific transmission ratio (<2.5), a slight profile curvature results if straight or only slightly curved tool profiles are used. This allows the crown wheel 32 to be solely formed, without the associated pinion 31 having to be modified excessively strongly. In the case of plunge cutting using the mentioned tool profiles, a profile having no or only slight curvature results.

Figure 9B:
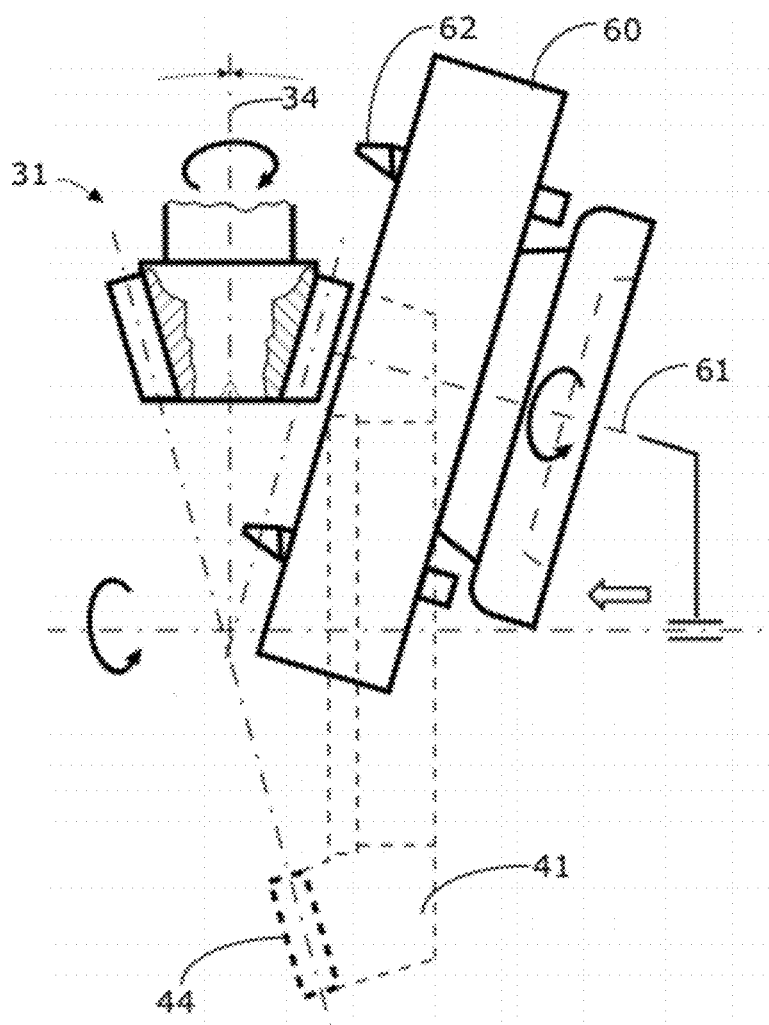
FIG. 9B is a schematic illustration of a forming method according to the invention having a hobbed pinion formed by a tapered generating wheel.

In one embodiment, the pinion 31 is manufactured by the milling of tooth gaps (see also FIG. 9B). The milling of the tooth gaps of the pinion 31 is performed using a second milling cutter head 60 (also referred to more generally here as the second tool), which is set into rotation around a tool axis 61 and which executes a hobbing movement according to a modified hobbing method. The pinion blank 31 is rotated continuously around its workpiece axis 34 (pinion axis) during the milling. In the modified hobbing method, the hobbing cradle and the pinion blank 31 execute a coupled movement, from which a curved flank profile of the pinion 31 arises as the result. The hobbing cradle is only one axis of a computer model, or a virtual gear cutting machine. It is not actually present on the machine 100.

The second milling cutter head 60 is defined by the conical virtual generating wheel 41 so that tooth gaps having tooth flanks are milled on the pinion blank 31, which, viewed in the profile direction, have a significant curvature, in order to run correctly with the plunge-cut crown wheel 32 having lesser profile curvature.

If one uses straight tool profiles during the plunge cutting of the crown wheel 32 on the first tool 50, a straight tooth vertical profile is obtained. However, slightly curved tool profiles can also be used on the first tool 50 according to the invention to produce a profile crowning on the plunge-cut crown wheel 32. The crown wheel tooth profile produced is then also slightly curved. If needed, the tool profile of the first tool 50 can also be strongly curved and a similar curvature as in the conventional hobbed crown wheel can be achieved on the plunge-cut crown wheel 32. The profile of the second tool 60 of the pinion 31 is then curved in the other direction (concave) to ensure the required adaptation.

However, according to another embodiment, a straight tool profile of the first tool 50 can also be used. In this case, the desired profile crowning can be produced by the milling kinematics of the machine 100. The tooth profile can also have a slight curvature to produce a profile crowning of the tooth flanks. In these two cases, the radius of curvature of the crown wheel vertical profile is greater than 20 times the tooth height.

The corresponding pinion 31 of a bevel gear pair 30 (see FIG. 8) must be produced in a modified hobbing method, as described, so that the hobbed pinion 31 and plunge-cut crown wheel 32 can run correctly with one another. Details in this regard can be inferred, e.g., from the book "Kegelräder; Grundlagen, Anwendungen [Bevel Gears; Fundamentals, Applications]", by J. Klingelnberg, Springer Verlag, 2008, pages 16-17.

Figure 5:
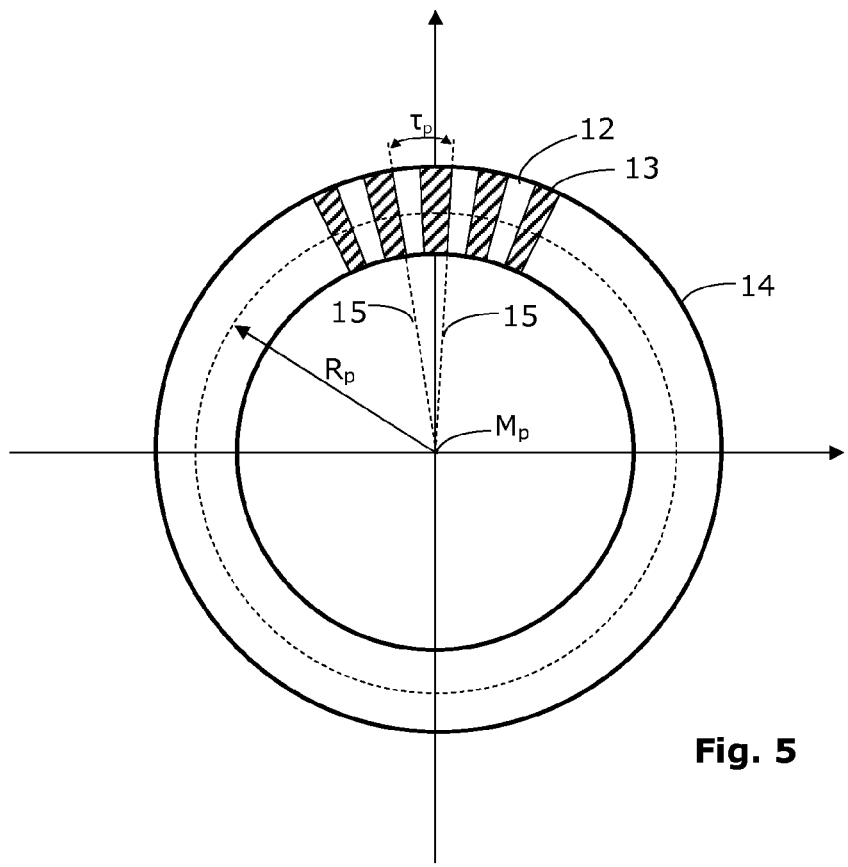
FIG. 5 is a schematic cross-sectional illustration of a bevel gear having straight teeth.

A schematic illustration of a plane gear 14 having hypocycloidal straight teeth is shown in FIG. 5, only a part of the teeth 13 (in the present case five teeth) being shown shaded. The following equation (5) applies for such a plane gear 14:

$$\tau_p = \frac{m_P \cdot \pi}{R_P} = \frac{2 \cdot \pi}{z_P} \tag{5}$$

The plane gear pitch angle $\tau_p$ can be calculated on the basis of this equation (5), if (plane gear) module $m_p$ and plane gear radius Rp are known or if plane gear tooth count $z_p$ is known. FIG. 5 shows that in the case of a straight-toothed bevel gear 14, the reference flank lines 15 (flank line) are straight lines, which typically go radially through the plane gear center $M_p$. All corresponding formulas are well known. Details in this regard can be inferred, e.g., from the book "Kegelräder; Grundlagen, Anwendungen [Bevel Gears; Fundamentals, Applications]", by J. Klingelnberg, Springer Verlag, 2008, where the corresponding formulas are shown on pages 39 et seq.

The first and second milling cutter heads 50, 60, which can be used for the purpose of producing bevel gears having straight hypoid teeth, can be calculated and produced on the basis of these findings.

Figure 6:
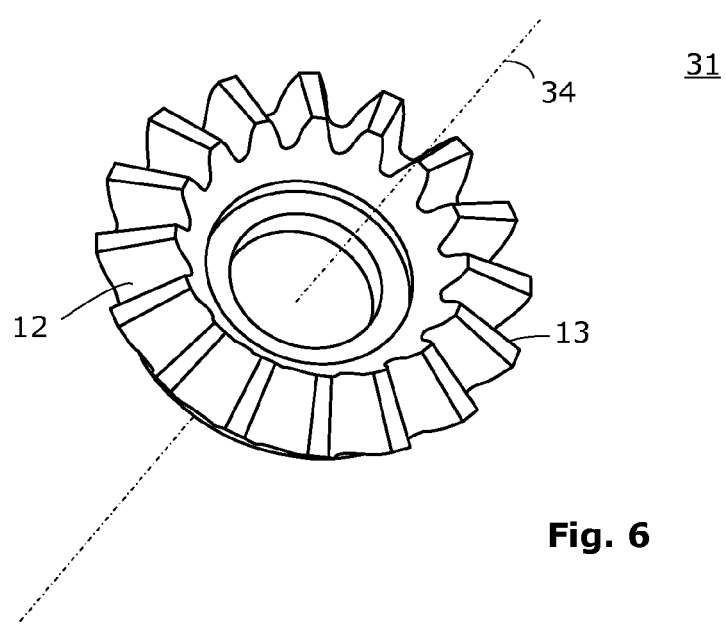
FIG. 6 is a schematic top perspective view of a bevel gear pinion having straight teeth.

FIG. 6 shows the example of a bevel gear pinion 31 having straight teeth in a schematic perspective view. The teeth 13 and tooth gaps 12 may be seen in this figure.

Figure 7:
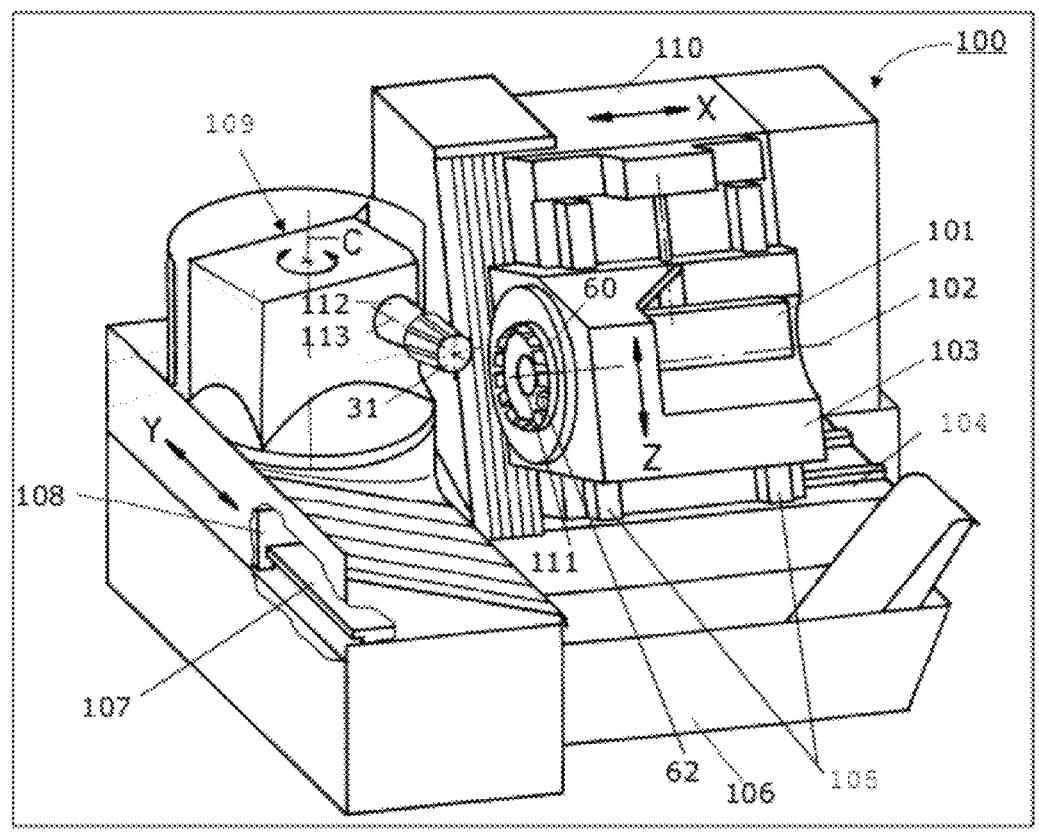
FIG. 7 is a perspective view of a bevel gear cutting machine.

FIG. 7 shows a perspective view of the basic construction of a corresponding CNC machine 100 (also referred to as a bevel gear cutting machine) for gear cutting of bevel gears, bevel gear pinions (e.g., the pinion 31) having hypoid teeth and crown wheels 32 having straight or quasi-straight hypoid teeth.

The CNC machine 100 can be constructed as follows. A machine housing 110 is guided horizontally and linearly along a linear coordinate axis X (first axis) on a machine bed 106. A first carriage 103 is vertically movable along a linear coordinate axis Z (second axis) using a spindle drive 101 on a guide 105, which is attached to a lateral surface of the machine housing 110. A workpiece spindle carrier having a second carriage 108 is guided horizontally and linearly on a guide 107 on the machine bed 104 along a linear coordinate axis Y (third axis), which is perpendicular to the X axis in the CNC machine 100 shown in FIG. 7. A first pivot device 109 having vertical axis C (fourth axis) is located on the carriage 108. The guide 105 of the first carriage 103 and the Z axis are inclined to the vertical in the CNC machine 100 shown in FIG. 7.

The first carriage 103 carries a tool spindle 111, which is rotatably mounted about a tool spindle axis 102 (fifth axis). The tool spindle 111 carries a (milling) tool. In the modified hobbing, the tool spindle 111 carries the second milling tool 60 here (for example, a cutter head 60 having multiple bar cutters 62). During the plunge cutting, the tool spindle 111 carries the first milling tool 50 here (for example, a cutter head 50 having multiple cutters 52). A workpiece spindle 112 is horizontally guided and is linearly displaceable or pivotable on the machine bed 106 by the second carriage 108 and by the first pivot device 109. The first pivot device 109 carries the workpiece spindle 112, which is rotatable around a workpiece spindle axis 113 (sixth axis). The workpiece spindle 112 carries a blank, such as, for example, pinion blank 31 or crown blank 32. In the present example, a straight-toothed pinion blank 31 is machined in the machine 100. The first pivot device 109 is pivotable horizontally guided around the C axis, in order to pivot the blank into a machining position. The workpiece spindle 112 can be provided with a chuck for chucking the blank.

Figure 1A:
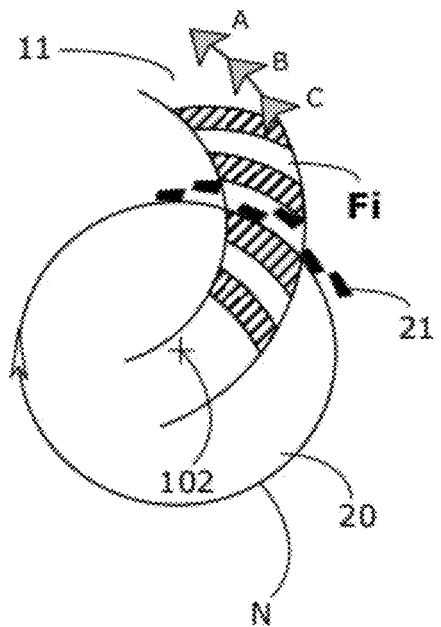
FIG. 1A is a schematic illustration of a known single indexing method.
Figure 1B:
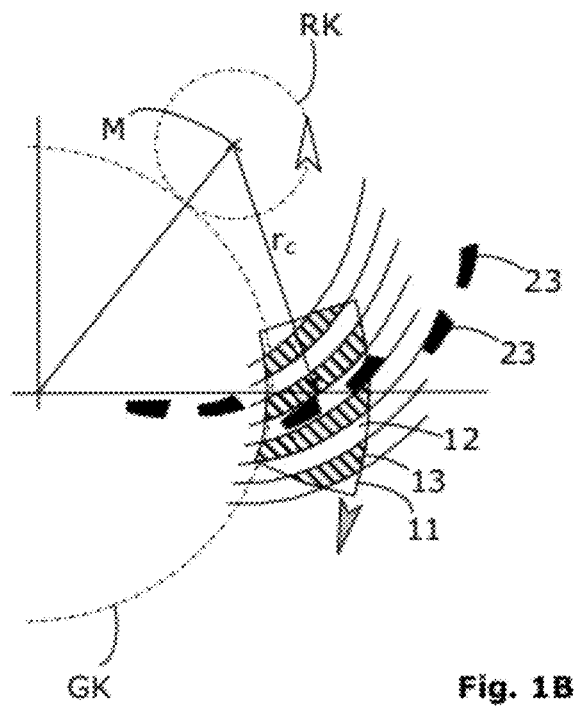
FIG. 1B is a schematic illustration of a known continuous indexing method, producing an epicycloid.
Figure 1C:
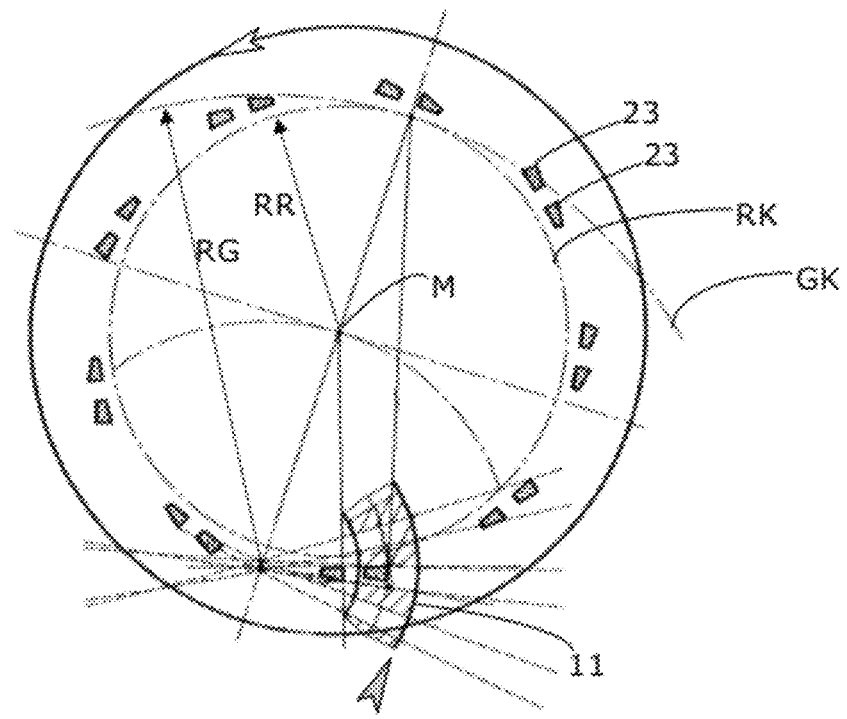
FIG. 1C is a schematic illustration of a known continuous indexing method, producing a hypocycloid.
Figure 2:
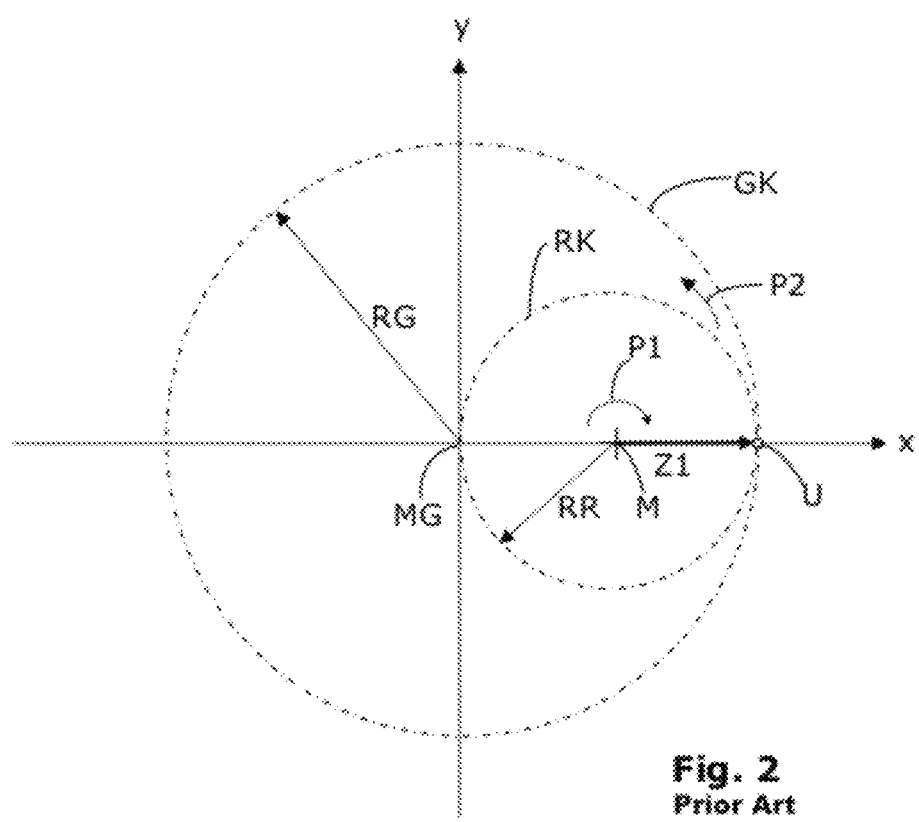
FIG. 2 is a schematic illustration of a known production of a hypocycloid.
Figure 3A:
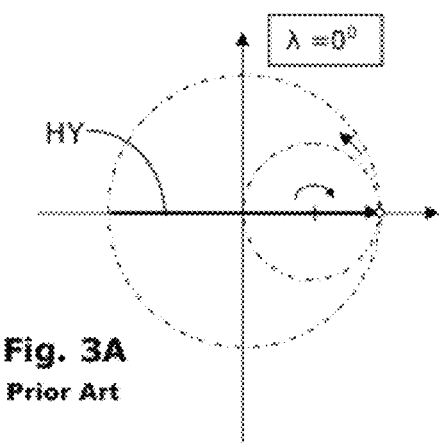
FIGS. 3A-3H show a schematic, step-by-step illustration of a known production of a linear hypocycloid.
Figure 3B:
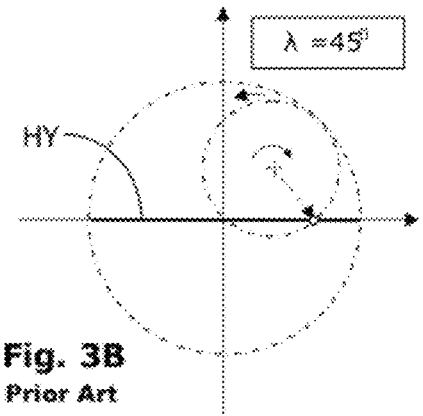
Figure 3C:
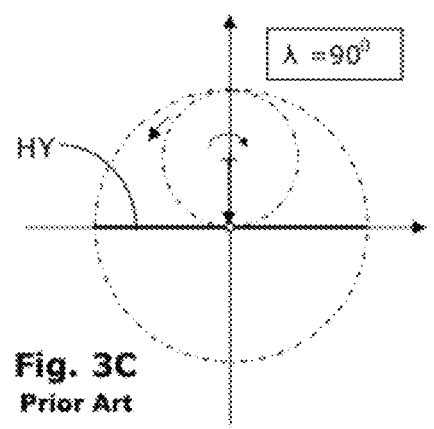
Figure 3D:
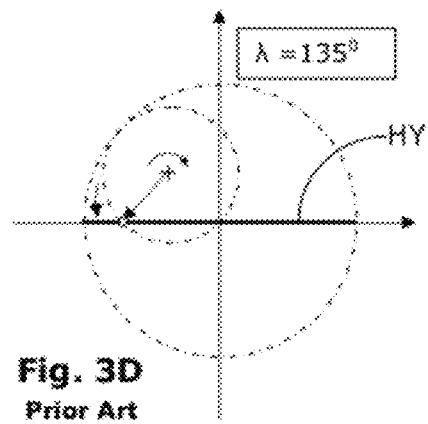
Figure 3E:
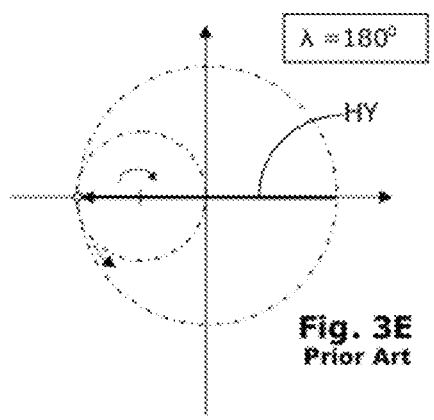
Figure 3F:
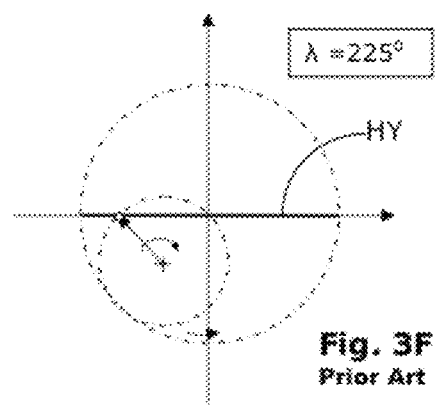
Figure 3G:
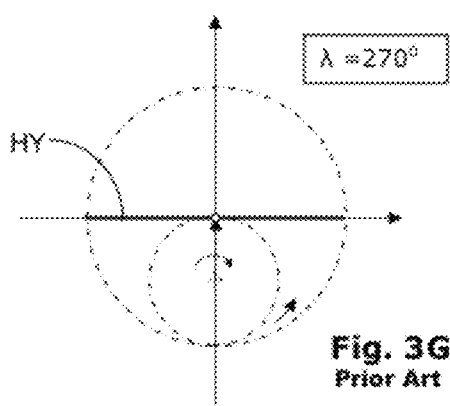
Figure 3H:
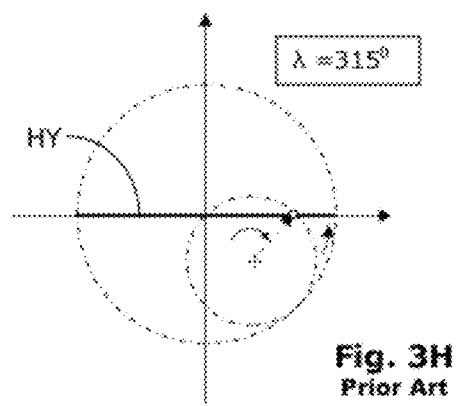

In one embodiment a milling method for producing bevel gears 31 and 32 having straight hypocycloidal teeth in the continuous forming method is provided. A milling tool (e.g., a cutter head 50 or 60) is used, which is in a synchronized movement with the bevel gear 31, 32 (similarly to FIG. 1C). The milling tool 50 or 60 has a cutter head nominal radius $r_c$.

In the described example, bevel gears 31, 32 having teeth which have hypocycloidal flank longitudinal lines result using such a milling tool 50 or 60.

During the milling of the crown wheel 32 a hypocycloid is produced as the flank longitudinal line where the rotation of the first tool 50 around its tool axis 51 and the rotation of the crown wheel blank 32 around its workpiece axis 33 are coupled. The machine 100 ensures the required coupling of the movement sequences. A controller for coupling the corresponding axial movements may be provided as part of the machine 100.

The mentioned axes, if they are not directly related to the bevel gear cutting machine 100 shown in FIG. 7, are the axes of a so-called virtual gear cutting machine. A gear cutting machine (e.g., the bevel gear cutting machine 100) is constructed to ensure the precise relative movements of the tool 50 or 60 and the blank 31 or 32 that the virtual tapered generating wheel 41 executes in engagement with the bevel gear 31, 32 to be manufactured. One tooth 44 of the generating wheel 41 is replaced by the profile of the tool 50, 60, or the blades of the tool 50, 60.

A straight-toothed bevel gear 31, 32 having hypocycloidal teeth is produced when the ratio of base circle radius RG of the base circle GK to rolling circle radius RR is selected to be RG/RR=2. In that case, bevel gears having straight-toothed hypocycloid are produced. The cutter head radius $r_c$ of the milling tools is $r_c$=RR in these examples.

Figure 4A:
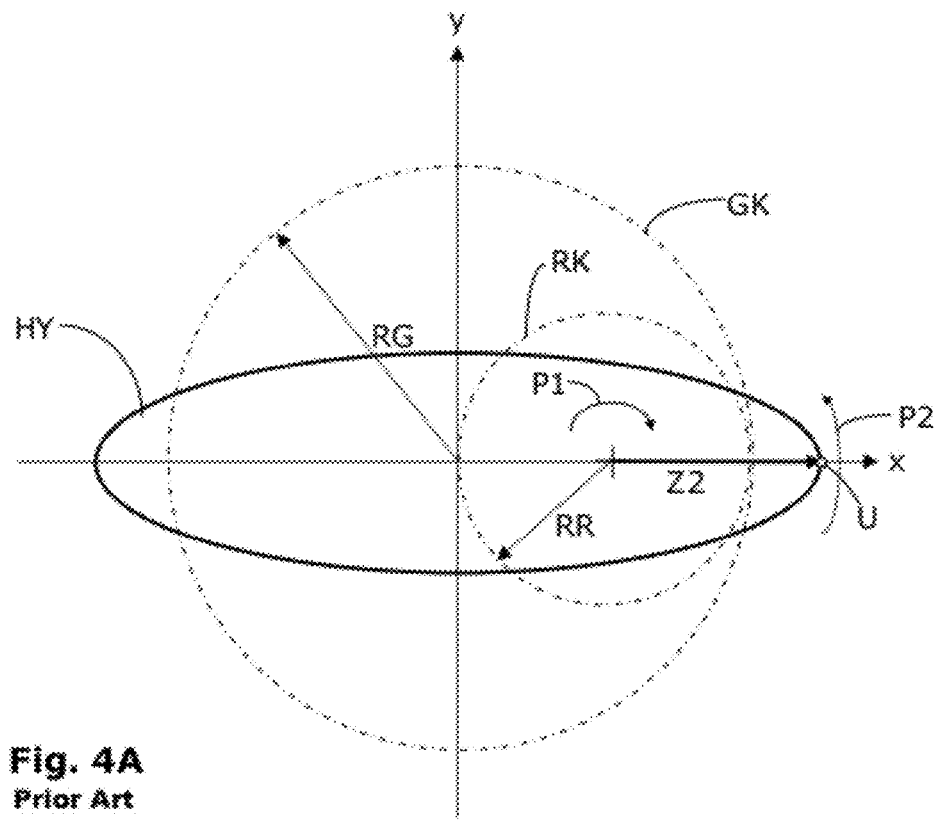
FIG. 4A is a schematic illustration of a known production of an extended elliptical hypocycloid.
Figure 4B:
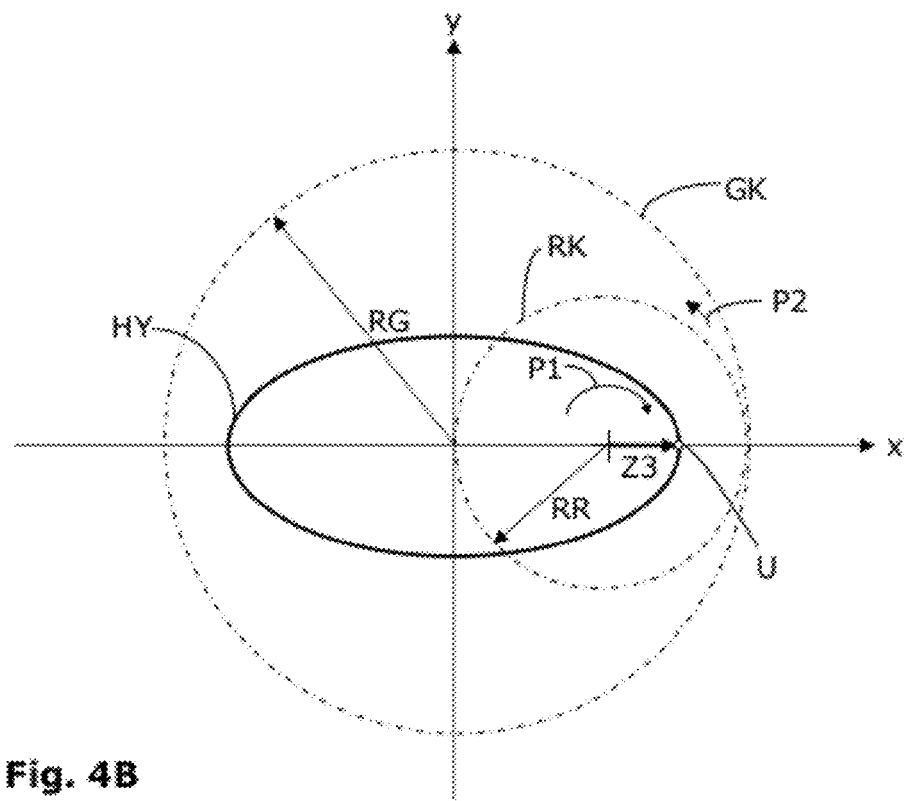
FIG. 4B is a schematic illustration of a known production of an abbreviated elliptical hypocycloid.

However, if RG/RR≠2, and the ratio of RG/RR only slightly deviates from 2, a hypocycloidal flank longitudinal line then results. This flank longitudinal line is considered to be nearly straight here (i.e., it has a slight curvature) if its radius of curvature is greater than 15 times the tooth width. In this instance, the base circle radius RG of the base circle GK is approximately twice as large as the rolling circle radius RR. For example, RG/RR=2±5%. The cutter head radius $r_c$ of the milling tools is respectively somewhat greater or less than the rolling circle radius RR in such instances (see also FIGS. 4A and 4B).

Figure 10A:
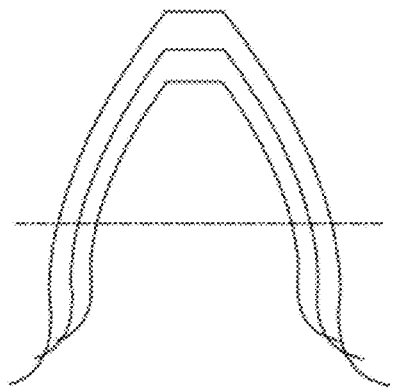
FIG. 10A is a schematic illustration of various profile sections of a known conventional hobbed pinion.
Figure 10B:
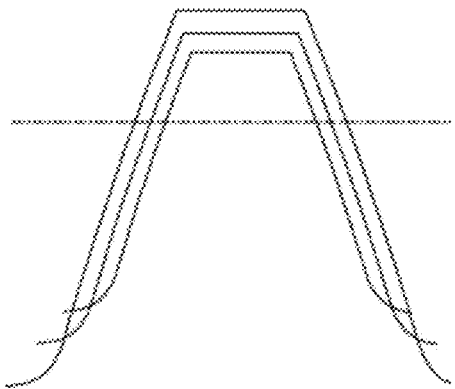
FIG. 10B is a schematic illustration of various profile sections of a known conventional hobbed crown wheel.

FIG. 10A shows a schematic illustration of the teeth of a conventional hobbed pinion and FIG. 10B shows a schematic illustration of the teeth of a conventional hobbed crown wheel. FIG. 11A shows a schematic illustration of corresponding teeth of a modified hobbed pinion 31, according to embodiments of the invention, and FIG. 11B shows a schematic illustration of the teeth of a plunge-cut crown wheel 32 according to embodiments of the invention. In each of these figures, the profile of a tooth on the heel, on the tooth middle, and on the toe are laid one over another. The profile of the hobbed crown wheel is slightly curved, while in contrast the profile of the plunge-cut crown wheel 32 is straight. The difference between the hobbed and the plunge-cut crown wheel 32 is slight, because the transmission ratio i=3.615, i.e., the transmission ratio i is greater than 2, as required above. The profile of the pinion 31 for a plunge-cut crown wheel 32 is curved more strongly than the profile of a pinion for a hobbed crown wheel. The profile of the pinion 31 for a plunge-cut crown wheel 32 therefore has a somewhat lesser tooth base thickness and tooth head thickness.

Figure 12:
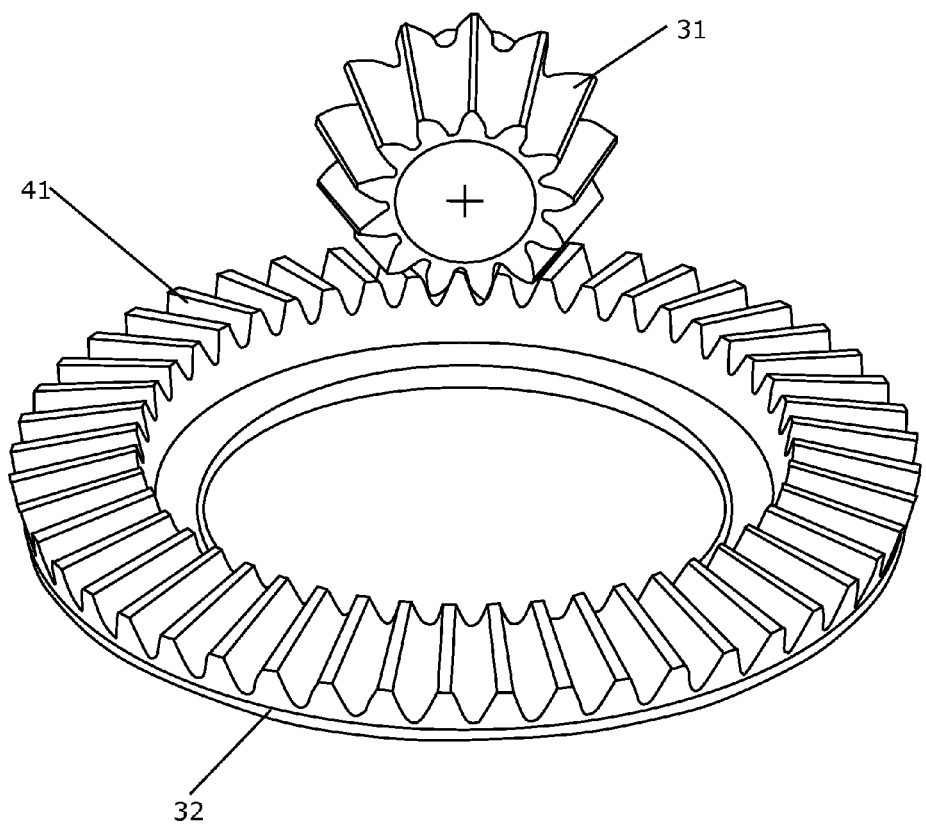
FIG. 12 is a schematic perspective view of a plunge-cut crown wheel, a modified hobbed pinion, and a corresponding tapered generating wheel according to the present invention.

Finally, reference is made to FIG. 12 for further explanation of the invention. A tapered generating wheel 41 is used, which corresponds to the crown wheel 32. The pinion 31 is produced in that it rolls down the tapered generating wheel 41 (which corresponds to the crown wheel 32). The second cutter head 60 (second tool) represents the tapered generating wheel 41 in the area in which it comes into contact with the pinion 31. The crown wheel 32 is produced in that the tapered generating wheel 41 (as the negative form of the crown wheel 32) plunges into the crown wheel 32. The first cutter head 50 (first tool) represents the tapered generating wheel 41 (as the negative form of the crown wheel 32) in the area in which it comes into contact with the crown wheel 32. The generating wheel 41 is an infinitely thin film for the hobbed/plunge-cut pair and comes into contact once with one side of the film with the pinion 31 and with the other side of the film with the crown wheel 32. The thin film, which represents the tapered generating wheel 41, is shown in gray in FIG. 12.

The cutting process (milling) can be both a two-flank cut or a one-flank cut. In the two-flank cut, the right and left flanks are produced simultaneously using one tool 50, 60 and one machine setting. In the one-flank cut, the right and left flanks are produced separately using different machine settings. In the latter case, it is possible that this is performed using the same cutter head 50, 60 or using two different cutter heads.

As may be recognized by those of ordinary skill in the pertinent art based on the teachings herein, numerous changes and modifications may be made to the above-described and other embodiments of the present invention without departing from the scope of the invention as defined in the claims.

What is claimed is:

1. A method comprising:
providing a crown wheel blank, and
forming a crown wheel by milling tooth gaps into the crown wheel blank by
rotating a first tool about a first tool axis and executing a plunge cutting movement to the crown wheel blank, the first tool being defined by a conical virtual generating wheel corresponding to an inverted cone shape of the crown wheel after formation thereof; and
simultaneously rotating the crown wheel blank continuously about a workpiece axis, coupling said rotation of the first tool and said rotation of the crown wheel blank so as to produce a substantially straight or linear hypocycloid flank longitudinal line.

2. A method according to claim 1, wherein the crown wheel blank defines a base circle defining a base circle radius, the first tool comprises a cutter head defining a rolling circle defining a rolling circle radius, and the base circle radius is approximately twice as great as the rolling circle radius, thereby forming said hypocycloid flank longitudinal line.

3. A method according to claim 1, wherein the first tool comprises a cutting tool.

4. A method according to claim 1, wherein the first tool comprises a face milling cutter head.

5. A method according to claim 1, further comprising the step of, prior to forming the crown wheel, defining the conical virtual generating wheel based on a desired design of the crown wheel.

6. A method according to claim 1, wherein the first tool reproduces the conical virtual generating wheel.

7. A method according to claim 1, wherein the first tool comprises blades in an area of engagement with the crown wheel blank thereby defined by teeth of the conical virtual generating wheel.

8. A method according to claim 1, wherein the tooth gaps define tooth flanks having a profile curvature defined by a tool profile shape of the first tool.

9. A method according to claim 8, wherein the tooth flanks, viewed in a profile direction, have a slight curvature.

10. A method according to claim 9, wherein the tooth flanks, viewed in the profile direction, have a radius of curvature that is greater than 20 times a mean normal module.

11. A method according to claim 1, further comprising:
providing a pinion blank and a second tool, and
manufacturing a pinion corresponding to the crown wheel from the pinion blank using the second tool.

12. A method according to claim 11, wherein the second tool is defined by the conical virtual generating wheel and the step of manufacturing a pinion comprises:
milling tooth gaps into the pinion blank by
rotating the second tool about a second tool axis and executing a modified hobbing movement adapted for milling said tooth gaps into said pinion blank; and
simultaneously rotating the pinion blank continuously about a second workpiece axis.

13. A method according to claim 12, wherein the step of executing a modified hobbing movement comprises pivoting the second tool about a hobbing cradle axis between a hobbing starting position and a hobbing final position.

14. A method according to claim 13, wherein the hobbing cradle axis is defined by a hobbing cradle angle, and corresponds to a plane gear axis of the conical virtual generating wheel.

15. A method according to claim 11, wherein the crown wheel and the pinion are formed and configured to define a bevel gear pair having a transmission ratio greater than 2.

16. A method according to claim 1, wherein the step of executing a plunge cutting movement defines said tooth gaps in precise reproduction of a tool profile of the first tool.

17. A method according to claim 1, wherein the plunge cutting movement comprises a linear plunging movement along a feed axis defined by a depth direction of said movement.

* * * * *